(No Model.)
S. H. WALTON & J. H. SMITH.
VEHICLE STEP.
No. 477,719. Patented June 28, 1892.
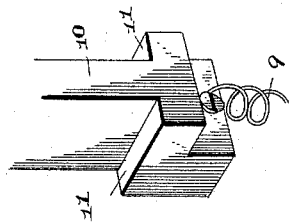
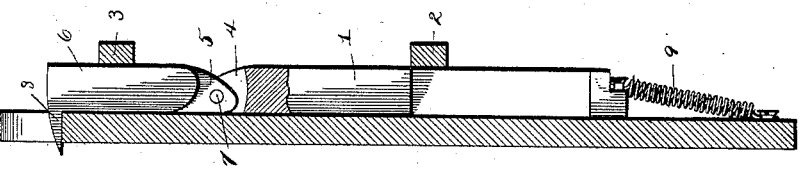
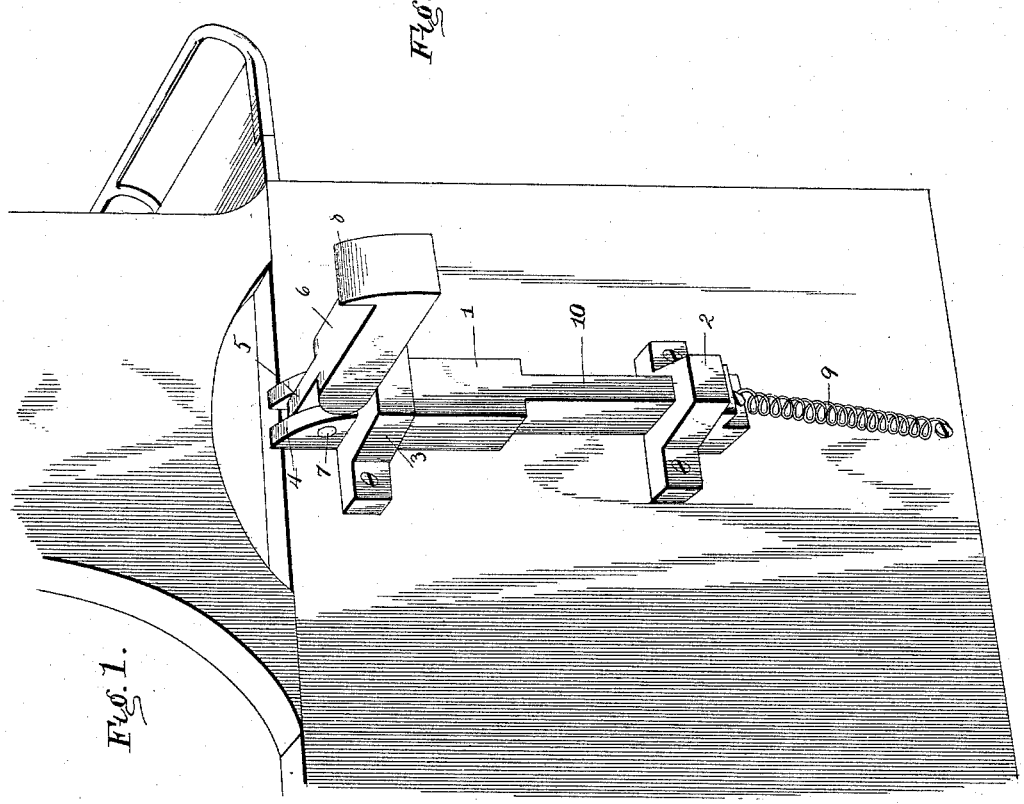
Witnesses
Chas. A. Ford.
H. F. Riley
Inventors:
Sam H. Walton and
James H. Smith.
By their Attorneys,
C. A. Snow & Co.

UNITED STATES PATENT OFFICE.

SAMUEL HOUSTON WALTON AND JAMES H. SMITH, OF BELTON, TEXAS.

VEHICLE-STEP.

SPECIFICATION forming part of Letters Patent No. 477,719, dated June 28, 1892.

Application filed November 2, 1891. Serial No. 410,668. (No model.)

*To all whom it may concern:*

Be it known that we, SAMUEL HOUSTON WALTON and JAMES H. SMITH, citizens of the United States, residing at Belton, in the county of Bell and State of Texas, have invented a new and useful Vehicle-Step, of which the following is a specification.

The invention relates to improvements in steps for vehicles.

The object of the present invention is to provide for vehicles a step which will be simple and inexpensive in construction and when not in use will be entirely out of the way.

The invention consists in the construction and novel combination and arrangement of parts hereinafter fully described, illustrated in the accompanying drawings, and pointed out in the claims hereto appended.

In the drawings, Figure 1 is a perspective view of a step constructed in accordance with this invention, the parts being shown in operative position. Fig. 2 is a longitudinal sectional view, the parts being folded. Fig. 3 is a detail perspective view of the lower end of the sliding bar.

Like numerals of reference indicate corresponding parts in all the figures of the drawings.

1 designates a sliding bar arranged in keepers or guides 2 and 3, and designed to be secured by them to the body of a vehicle and having its upper end 4 bifurcated and pivoted to a reduced end 5 of a step 6. The bar 1 is vertically disposed and is adapted to be lifted sufficiently to allow the step 6, which is hinged to the bar 1 by a pivot 7, to be swung down in a horizontal position and to rest on the upper keeper 3, as illustrated in Fig. 1 of the accompanying drawings. The step 6 is provided at its outer end with a projecting flange or lip 8, which prevents the foot slipping off the step, and the latter when not in use is folded against the body of a vehicle, and is maintained in that position by a spring 9, which is secured to the body and to the lower end of the bar 1. The bar 1 has its lower portion 10 reduced to form shoulders 11 to limit the movement of the bar, and the keeper or guide 2 has a smaller opening than the keeper or guide 3 to accommodate the reduced portion 10.

It will be seen that the step is simple and comparatively inexpensive in construction, adapted to be readily applied to the body of a vehicle, and is capable when not in use of being folded out of the way against the body of the vehicle.

The keepers 2 and 3 are secured to the body by bolts, screws, or the like, or by any other suitable means.

What we claim is—

1. A step for vehicles, comprising guides or keepers, a sliding bar arranged in the guides or keepers, and a step hinged to the upper end of the sliding bar and adapted to be swung down in a horizontal position when the bar is raised and to be maintained in a vertical position when the bar is lowered, substantially as described.

2. A step for vehicles, comprising guides or keepers, a bar sliding in the same, a step hinged to the upper end of the bar and adapted to be lowered to a horizontal position, and a spring attached to the sliding bar to hold the latter normally lowered, substantially as described.

3. A step for vehicles, comprising guides or keepers, a bar sliding in the same and provided with shoulders to limit its movement, a step hinged to the upper end of the bar and adapted to be lowered to a horizontal position, and a spring connected with the bar, substantially as and for the purpose described.

In testimony that we claim the foregoing as our own we have hereto affixed our signatures in the presence of two witnesses.

SAM. HOUSTON WALTON.
JAMES H. SMITH.

Witnesses:
R. PETERSON,
T. W. HYDE.